(12) United States Patent
Heinzl

(10) Patent No.: US 10,143,971 B2
(45) Date of Patent: Dec. 4, 2018

(54) CRYSTALLIZATION SYSTEM WITH FRAME ELEMENTS

(71) Applicant: Major Bravo Limited, Tortola (VG)

(72) Inventor: Wolfgang Heinzl, Ramerberg (DE)

(73) Assignee: Major Bravo Limited, Tortola (VG)

( * ) Notice: Subject to any disclaimer, the term of this patent is extended or adjusted under 35 U.S.C. 154(b) by 288 days.

(21) Appl. No.: 14/762,756

(22) PCT Filed: Jan. 9, 2014

(86) PCT No.: PCT/EP2014/050268
§ 371 (c)(1),
(2) Date: Jul. 22, 2015

(87) PCT Pub. No.: WO2014/114495
PCT Pub. Date: Jul. 31, 2014

(65) Prior Publication Data
US 2015/0360179 A1    Dec. 17, 2015

(30) Foreign Application Priority Data
Jan. 22, 2013 (DE) .................. 10 2013 200 998

(51) Int. Cl.
*B01D 61/36*    (2006.01)
*B01D 9/00*    (2006.01)
(Continued)

(52) U.S. Cl.
CPC ......... *B01D 61/364* (2013.01); *B01D 9/0018* (2013.01); *B01D 9/0072* (2013.01);
(Continued)

(58) Field of Classification Search
CPC ..... C02F 1/447; B01D 61/364; B01D 61/005; B01D 9/0004; B01D 2311/2642; B01D 2313/38
See application file for complete search history.

(56) References Cited

U.S. PATENT DOCUMENTS 4,886,646 A    12/1989  Carter et al.
6,716,355 B1 *  4/2004  Hanemaaijer ........ B01D 61/364
                                                    210/640
(Continued)

FOREIGN PATENT DOCUMENTS

DE         19859876 A1   6/2000
DE      102008004237 A1   7/2009
(Continued)

*Primary Examiner* — Katherine Zalasky
*Assistant Examiner* — Liam Royce
(74) *Attorney, Agent, or Firm* — Mintz Levin Cohn Ferris Glovsky and Popeo, P.C.; Peter F. Corless; Steven M. Jensen

(57) ABSTRACT

A system for crystallizing a material that is dissolved in a solvent includes: a crystallization device through which a solution that is to be concentrated flows, the solution including the solvent containing the material to be crystallized and dissolved in the solvent, and a liquid having a lower temperature than the solution to be concentrated. The system includes at least one flow channel guiding the solution to be concentrated and at least one flow channel guiding the liquid, where the inner space of each respective flow channel guiding the liquid is delimited at least in part by a membrane wall that is permeable for the vaporous solvent, where a vapor pressure difference enables the solvent to pass from the solution to be concentrated across the membrane wall.

8 Claims, 10 Drawing Sheets

Figure 1:
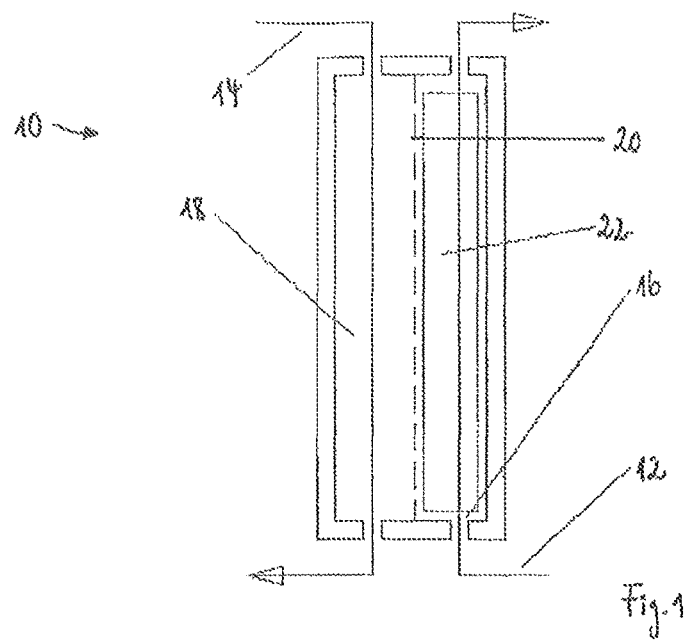

(51) Int. Cl.
*B01D 61/00* (2006.01)
*C02F 1/44* (2006.01)

(52) U.S. Cl.
CPC .......... *B01D 9/0004* (2013.01); *B01D 61/005* (2013.01); *B01D 2311/2642* (2013.01); *B01D 2313/38* (2013.01); *C02F 1/447* (2013.01)

(56) References Cited

U.S. PATENT DOCUMENTS

| | | | |
|---|---|---|---|
| 2011/0259822 A1* | 10/2011 | Al-Jlil | B01D 61/364 210/615 |
| 2012/0038069 A1* | 2/2012 | Heinzl | B01D 61/362 261/108 |
| 2013/0264260 A1 | 10/2013 | Heinzl | |
| 2015/0298997 A1* | 10/2015 | Shimizu | B01D 63/14 210/640 |

FOREIGN PATENT DOCUMENTS

| | | |
|---|---|---|
| DE | 102010050892 A1 | 4/2012 |
| WO | 2005089914 A1 | 9/2005 |
| WO | 2012062392 A1 | 5/2012 |
| WO | 2012112601 A2 | 8/2012 |

* cited by examiner

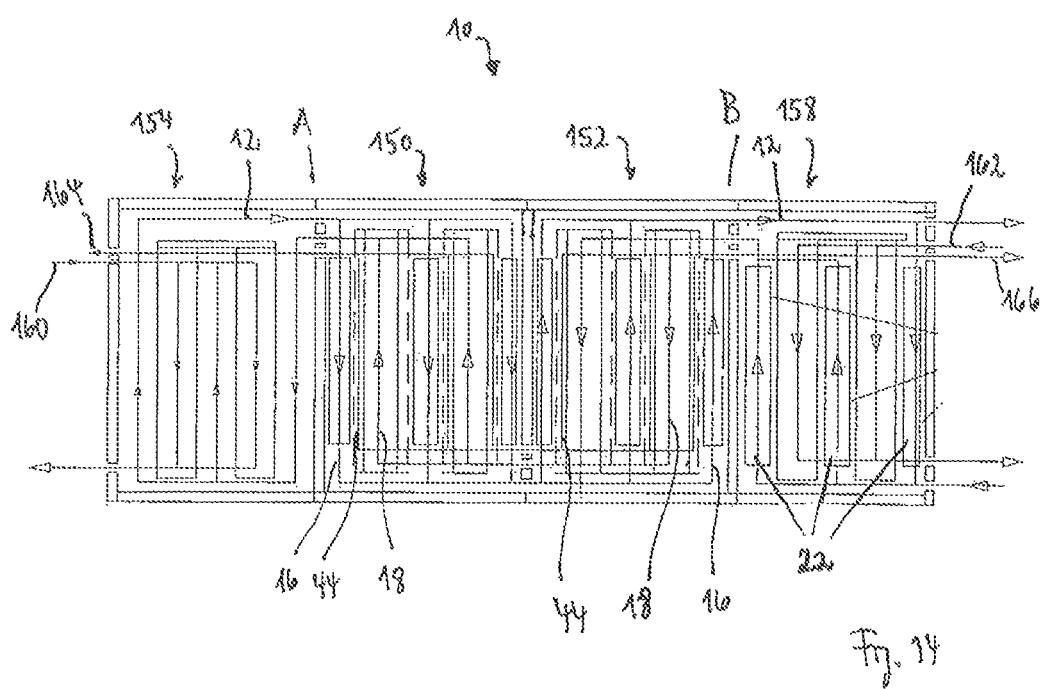

CRYSTALLIZATION SYSTEM WITH FRAME ELEMENTS

CROSS-REFERENCE TO RELATED APPLICATIONS

This application is a national Phase application filed under 35 USC 371 of PCT international Application No. PCT/EP2014/050268 with an International Filing Date of Jan. 9, 2014, which claims under 35 U.S.C. § 119(a) the benefit of German Application No. 10 2013 200 998.4, filed Jan. 22, 2013, the entire contents of which are incorporated herein by reference.

The present invention relates to a system and to a method for the crystallization of a material dissolved and to be crystallized in a solvent, wherein the material is in particular a salt.

The crystallization can have many different fields of application, for example, the production of pure substances and purest substances, amongst other things for the pharmaceutical industry, the fractioned crystallization for the precipitation of two or more substances present in a solution and the reduction of the volume of a salt containing solution, as well as the production of the salt(s) by means of crystallization. Having regard to the production of pure substances and of purest substances a specifically defined crystallization is to be striven for in which the oversaturation can be set through the parameters volume flow, temperature and driving potential. Having regard to the fractioned crystallization an as fast as possible crystallization with respect to the crystal mass is advantageous, the crystallization also being able to be set via the parameters volume flow, temperature and driving potential.

A concentration method with possible crystallization is described in the document WO 2012/112601 A2, wherein a concentration difference is used. A disadvantage of this method is that a plate apparatus, in which vapor stemming from a vapor compressor is condensed, is immersed into the solution from which a crystallization should take place. This procedure makes it very demanding in effort and cost to maintain the ebullition of the solution at a low level or to inhibit it. If the solution ebullizes, undesired scaling effects have to be assumed by means of which an incrustation by means of crystallization is present. For this reason, one has to attempt to avoid the ebullition of the solution using measurement and regulation technology demanding in effort and cost. Moreover, the oversaturation required for a defined crystallization as well as the degree of oversaturation can only be set in a defined way in a complicated manner.

Further known crystallizers are vapor crystallizers, recirculating cooling crystallizers and vacuum crystallizers.

The crystallization of the salt is brought about by evaporation of the solvent in vapor crystallizers.

Recirculating cooling crystallizers have a tube crystallizer into which the solution is introduced as well as a belt scraper that scrapes the solution introduced into the tube crystallizer at the tube wall. There the solution cools, wherein crystals fall out that are scraped away by the belt scraper and are transported to an outlet. The crystal slurry and the residual solution are subsequently transported to a centrifuge and separated there.

During the vacuum crystallization the hot saturated solution is introduced into an evacuated container. A part of the solution that starts to boil in vacuum evaporates. The evaporation energy is drawn from the solution which brings about a cooling of the solution. Thereby an oversaturated solution is present in the crystallization container by means of concentration and cooling.

As the known crystallizers process large volumes, the process parameters, such as for example the temperature for the control of the process can only be adapted slowly. An exactly defined crystallization is made difficult for this reason. A slow, targeted cooling in order to permit the crystallization of various materials one after the other and the targeted separation into fractions are also only possible in a complicated manner.

The invention is based on the object of creating an improved system for the crystallization of a material dissolved and to be crystallized in a solvent which ensures a reliable and energy efficient crystallization for an as simple and compact as possible assembly. Furthermore, a corresponding method should be provided. In particular the crystallization system should be configured in such a way that the position of the crystallization can be influenced via the flow velocity and the temperature of the salt solution. Furthermore, the crystallization system should enable a fast change of the flow velocity and of the temperature via small volumes and to avoid air/gas boundary surfaces at which the crystallization can take place in the apparatus, to work in a crystal saving manner, to design the crystal shape and particle size in a settable manner, to carry out a fractioned crystallization and to separate the crystals during a continuous operation.

The object on which the invention is based is satisfied by a system for the crystallization of a material dissolved and to be crystallized in a solvent, wherein the material is in particular a salt, the system having a crystallization apparatus flowed through by a solution to be concentrated, the solution having the solvent with the material dissolved and to be crystallized therein, and by a liquid that has a lower temperature than the solution to be concentrated. The crystallization apparatus has at least one flow passage conducting the solution to be concentrated and has at least one flow passage conducting the liquid. The internal space of a respective flow passage conducting the solution to be concentrated is bound at least partly by a membrane wall permeable for the vapor of the solvent but not for the liquid solvent. A respective flow passage conducting the liquid is associated with at least one respective flow passage conducting the solution to be concentrated and is in particular arranged adjacent thereto.

As the solution to be concentrated has a higher temperature and, in particular a higher vapor pressure than the liquid, the vapor pressure of the solution to be concentrated is larger in the internal space of the respective flow passage than at the adjacent side of the membrane wall. This vapor pressure difference which is set over and via the membrane wall results therein that the solvent passes from the solution to be concentrated through the membrane wall permeable for the vapor-like solvent.

The solution to be concentrated is moved along the membrane wall by means of the flow passage which has the consequence that the solvent is removed from the solution to be concentrated on the path through the flow passage. Nucleation and crystallization start through the increasing concentration of the material dissolved and to be crystallized in the solution to be concentrated along the membrane wall.

Due to this formation the system can be maintained relatively simple and compact for a relatively large crystallization performance. A larger number of flow passages conducting the solution to be concentrated and of flow passages conducting the liquid can in particular also be provided without any problems, whereby the efficiency of the system is correspondingly increased.

The vapor-permeable, liquid-tight membrane wall can be the wall of a hollow fiber or of a tube or of a planar element. The crystallization apparatus can, for example be configured as a bunch of hollow fibers or a bunch of tubes, a plate module or a wrapped module. The membrane wall can, for example be manufactured from microporous, hydrophobic materials, for example from polytetrafluoroethylene, polypropylene, polyethylene or polyvinylidene fluoride.

Through the use of flow passages in the crystallization apparatus small volumes of the solution to be concentrated are in contact with large material and heat exchange surfaces. Small volumes have a low thermal inertia and react quickly to changes of the process parameters, such as for example the temperature.

An oversaturation of the solution is required for the crystallization. The solution to be concentrated can already have a concentration of the material to be crystallized at the saturation point when it enters into the process. The concentration increases, saturation and oversaturation are achieved and nucleation and crystal growth are brought about through the reduction of the solvent in the solution to be concentrated during the process. The degree of oversaturation can be set via the flow velocity and the driving inclination caused by the vapor pressure difference over and via the membrane wall and in this way the crystal shape and particle size can be influenced. Furthermore, the location of the crystallization can be influenced via the flow velocity and the temperature of the solution to be concentrated.

The space adjacent to the flow passage conducting the solution to be concentrated can be filled with liquid or partly filled with liquid or with gas at the start of the process and can be at normal pressure or at vacuum.

In accordance with an embodiment, a respective flow passage conducting the liquid is directly adjacent to the membrane wall of a respective flow passage conducting the solution to be concentrated. As the liquid has a lower vapor pressure than the solution to be concentrated, the solvent that passes through the membrane wall in vapor form directly enters into the flow passage conducting the liquid, condenses there and is mixed with the liquid already present in the flow passage.

The thermal quantity made available via evaporation and/or humidification of the liquid to be concentrated by means of the vapor pressure difference is supplied to the liquid having the lower vapor pressure as vapor via the membrane wall. This leads to a cooling of the solution to be concentrated and to a heating of the liquid adjacent thereto via the membrane wall through condensation of the vapor passing through the membrane wall.

As an alternative to the previously described embodiment, a flow passage provided for a conducting away of the solvent which has passed through the membrane wall can be arranged between a respective flow passage conducting the solution to be concentrated and a respective flow passage conducting the liquid. The flow passage conducting the liquid is separated from the flow passage provided for the conducting away of the solvent which has passed through the membrane wall by means of a wall which is in particular vapor-tight and liquid-tight for the solvent, but thermally conductive.

Having regard to this embodiment the solvent passes through the membrane wall as vapor and condenses at the wall which is both vapor-tight and liquid-tight and that separates the additional flow passage from the flow passage conducting the liquid and that is maintained at a temperature that is sufficiently low for the condensation by means of the cold liquid. The additional flow passage then allows a simple conducting away of the solvent passed through the membrane wall and condensed. At the start of the process the flow passage provided for the conducting away of the solvent passed through the membrane wall can be filled with environmental air, after the start of the process it then rapidly fills with the solvent passed through the membrane wall.

A further advantage of the additional flow passage arranged between the flow passage conducting the solution to be concentrated and the flow passage conducting the liquid is that the solvent passing through the membrane wall does not dilute the cold liquid present in the adjacent flow passage.

Preferably, the liquid flows through the crystallization apparatus in counter-flow with respect to the solution to be concentrated. Generally, however, such embodiments are also plausible in which the liquid flows through the crystallization apparatus in direct flow with respect to the solution to be concentrated.

In order to be able to process larger volume flows the crystallization apparatus advantageously comprises a plurality of flow passages conducting the solution to be concentrated and arranged in parallel with one another and a plurality of flow passages conducting the liquid and arranged in parallel with one another. For a given volume flow the flow velocity of the solution to be concentrated can be set via the number of the flow passages switched in parallel with one another and in this way the kinetics of the crystallization can also be influenced.

In this connection two flow passages conducting the solution to be concentrated are advantageously associated with at least one of the flow passages conducting the liquid. The flow passages conducting the solution to be concentrated can advantageously be arranged at opposite sides of the respective flow passage conducting the liquid. Through this measure the number of the flow passage conducting the liquid can be reduced.

It can be provided that the crystallization apparatus has a plurality of stages switched one after the other, wherein each stage comprises a plurality of flow passages switched in parallel with one another and conducting the solution to be concentrated. As, moreover, at least two of the stages have a different number of flow passages conducting the solution to be concentrated, the flow velocity of the solution to be concentrated increases in the stage with the lower number of flow passages and the kinetics of the crystallization is influenced.

The solution to be concentrated is moved along the membrane wall in accordance with the invention and the concentration of the material to be crystallized increases over and via the membrane wall by means of the vapor pressure difference with an increasing path in the flow passage.

This leads to the nucleation and to the crystallization in the flow passage conducting the solution to be concentrated. A density difference is present between the solution to be concentrated and the crystals, the density difference bringing about a start of the sedimentation of the crystals.

Preferably, a sediment collection container adjoins at the bottom of one of the respective flow passages conducting the solution to be concentrated, in which sediment collection container the sediment, this means the generated crystals, can be caught. The sediment collection container is advantageously filled with the solution to be concentrated, but is not flowed through by the solution to be concentrated. An outlet can be provided at the lower region of the sediment collection container via which the sediment collection container can, for example, be emptied and monitored by a sensor.

Crystals that accrue at the upper boundary of the flow passage conducting the solution to be concentrated have the longest sedimentation path and the maximum sedimentation time. Following a maximum time that results from the height of the flow passage and the sedimentation speed the crystals arrive at the sediment collection container. From the sedimentation time and the flow velocity a maximum path length required for the sedimentation can be calculated. Having regard to a fractioned distillation that, for example, takes place via the temperature along the membrane wall this can be considered for the materials to be individually crystallized.

In order to efficiently reclaim the heat that is transferred during the process onto the liquid with the lower vapor pressure, the system preferably includes a heat exchanger that cools a liquid flowing out of the crystallization apparatus and heats the solution to be concentrated with the energy obtained therefrom.

In order to achieve a good thermal recovery, small temperature differences between the liquids adjacent to the membrane wall are required. As small temperature differences, however, only bring about a small potential difference via the membrane wall, larger membrane surfaces are required for a sufficient heat and material transfer.

It can be provided that both the flow passages conducting the solution to be concentrated and the flow passages conducting the liquid are flowed through by the solution to be concentrated. In other words the liquid to be concentrated is used for the liquid having the lower vapor pressure that, however, must have a lower temperature for this purpose than is present in the flow passages in which the crystallization takes place.

The solution flowing out of an outlet of the at least one flow passage conducting the solution to be concentrated can in this embodiment be supplied to a cooling element in order to be able to be supplied to an input of the at least one flow passage conducting the liquid following a sufficient cooling. In a corresponding manner a heating element and an input of the at least one flow passage conducting the solution to be concentrated can be connected downstream of an output of the at least one flow passage conducting the liquid.

Preferably, the crystallization apparatus is configured as a modular flow system. For this purpose the crystallization apparatus has a plurality of frame elements that can be combined with one another for the formation of different functional units, such as in particular of the at least one flow passage conducting the solution to be concentrated and of the at least one flow passage conducting the liquid, to form stacks comprising at least two, in particular at least ten frame elements. The frame elements respectively have an outer frame provided with passages, a central internal region bound by an outer frame and a sediment collection container arranged beneath the central internal region.

The system and in particular the crystallization apparatus can be assembled in a particularly simple manner and can be varied in the desired manner by means of the frame elements. The frame elements and/or the stages assembled by means of the frame elements are characterized by a relatively simple shape and provide different possibilities of liquid conductance.

Particularly preferably the crystallization apparatus has at least two different types of frame element that are alternatingly combined to form a stack. In this connection the central internal region of the one type of frame element forms a part of the at least one flow passage conducting the solution to be concentrated and the central internal region of the other type of frame element forms a part of at least one flow passage conducting the liquid.

A respective membrane wall can be arranged at both sides of the central internal region of a type of frame element, in particular can be welded thereto, the membrane wall being permeable for the vapor-like solvent but not for the liquid solvent. The central internal region of these frame elements then represents a part of the at least one flow passage conducting the solution to be concentrated.

The frame elements of the other type can respectively have a vapor-tight and liquid-tight film at both sides of the central internal region, with the vapor-tight and liquid-tight film in particular being able to be welded thereto. The central internal region of these frame elements then represents a part of the at least one flow passage conducting the liquid having the lower vapor pressure.

Having regard to the previous embodiment an intermediate space is formed between a respective one of the membrane wall and an adjacent film through the stacking of the frame elements. This intermediate space advantageously represents a part of the flow passage provided for the conducting away of the solvent which has passed through the membrane wall.

The above described object is further satisfied by a method for the crystallization of a material dissolved and to be crystallized in a solvent, wherein a solution to be concentrated that has the solvent having the material dissolved and to be crystallized therein is conducted through at least one flow passage and a liquid that has a lower temperature than the solution to be concentrated is conducted through at least one further flow passage. The internal space of a respective flow passage conducting the solution to be concentrated is bound at least partly by a membrane wall permeable for the vapor-like solvent but not for the liquid solvent. Furthermore, a respective flow passage conducting the liquid is adjacent to at least one respective flow passage conducting the solution to be concentrated, whereby a vapor pressure difference is set via the membrane wall in such a way that the solvent passes from the solution to be concentrated through the membrane wall.

In accordance with an embodiment, a respective flow passage conducting the liquid is directly adjacent to the membrane wall of a respective flow passage conducting a solution to be concentrated, wherein the liquid has a lower vapor pressure than the solution to be concentrated.

In accordance with an alternative embodiment, the solvent which has passed through the membrane wall is conducted away by a flow passage arranged between a respective flow passage conducting the solution to be concentrated and a respective flow passage conducting the liquid. The flow passage conducting the liquid is in this respect separated from the flow passage provided for the conducting away of the solvent which has passed through the membrane wall by means of a vapor-tight and liquid-tight wall.

A further aspect of the invention relates to a system for the crystallization of a material dissolved and to be crystallized in a solvent, having a crystallization apparatus flowed through by a solution to be concentrated that has the solvent having a material dissolved and to be crystallized therein and by a draw solution, wherein the crystallization apparatus has at least one flow passage conducting the solution to be concentrated and at least one flow passage conducting the draw solution. The internal space of a respective flow passage conducting the solution to be concentrated is bound at least partly by a semi-permeable membrane wall permeable for the solvent but not for the material dissolved and to be crystallized therein.

A respective flow passage conducting the draw solution is directly adjacent to the membrane wall of a respective flow passage conducting the solution to be concentrated in such a way that the solvent passes from the solution to be concentrated through the membrane wall into the adjacent flow passage conducting the draw solution.

The membrane wall of the previously described crystallization apparatus is an ion-selective membrane wall at whose one side a draw solution having a high concentration and in this way a high osmotic pressure is present and at whose other side the solution to be concentrated is present having a lower concentration and a lower osmotic pressure. Due to the difference in concentration and the in this way associated osmotic pressure difference the solution passes through the membrane wall into the draw solution. The ions of the material to be crystallized are retained by the membrane wall and the desired concentration of the solution arises.

The solution to be concentrated is moved along the membrane wall by means of the flow passage which has the consequence that the solvent is removed bit by bit from the solution to be concentrated. Nucleation and crystallization start through the increasing concentration of the material dissolved and to be crystallized in the solution to be concentrated along the membrane wall.

Salt solutions, for example which have, in particular, NaCl, $CaCl_2$, KCl or also, for example ammonium hydrogen carbide dissolved in water etc. can be used as a draw solution which is the driving force for the forwards osmosis. Besides salt solutions, solutions with organic compounds, such as for example sugar can also be used as a draw solution.

The use of solutions which can both be separated and regenerated via the vapor pressure, such as for example ammonium hydrogen carbonate in water, as draw solutions is in particular also plausible. Thus, for example, ammonium hydrogen carbonate can be dissolved in water, whereby one obtains a draw solution. If one heats this solution, gaseous $NH_3$ and $CO_2$ is released. Pure water remains.

A method in accordance with the invention for the crystallization of a material dissolved and to be crystallized in a solvent provides that a solution to be concentrated that has the solvent with the material dissolved and to be crystallized therein is conducted through at least one flow passage and a draw solution is conducted through at least one further flow passage. The internal space of a respective flow passage and a draw solution is conducted through at least one further flow passage. The internal space of a respective flow passage conducting the solution to be concentrated is bound at least partly by a semi-permeable membrane wall permeable for the solvent but not for the material dissolved and to be crystallized therein and a respective flow passage conducting the draw solution is directly adjacent to the membrane wall of a respective flow passage conducting the solution to be concentrated in such a way that the solvent passes from the solution to be concentrated through the membrane wall into the adjacent flow passage conducting the draw solution.

The previously described system operated via an osmotic pressure difference for the crystallization of a material dissolved and to be crystallized in a solvent, and the associated method can have the designs described in the foregoing which primarily relate to the crystallization with the aid of a vapor-permeable membrane wall. It should be noted that, during the forwards osmosis, however, the flow passage conducting the draw solution is always directly adjacent to the membrane wall of the flow passage conducting the solution to be concentrated.

Figure 2:
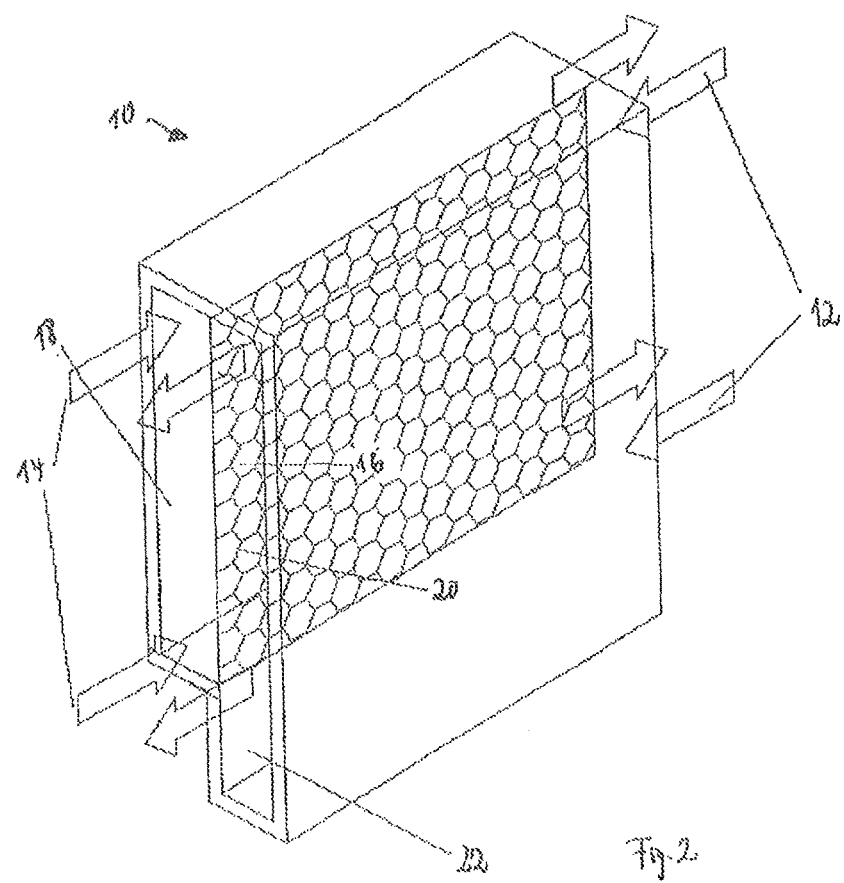
Figure 3:
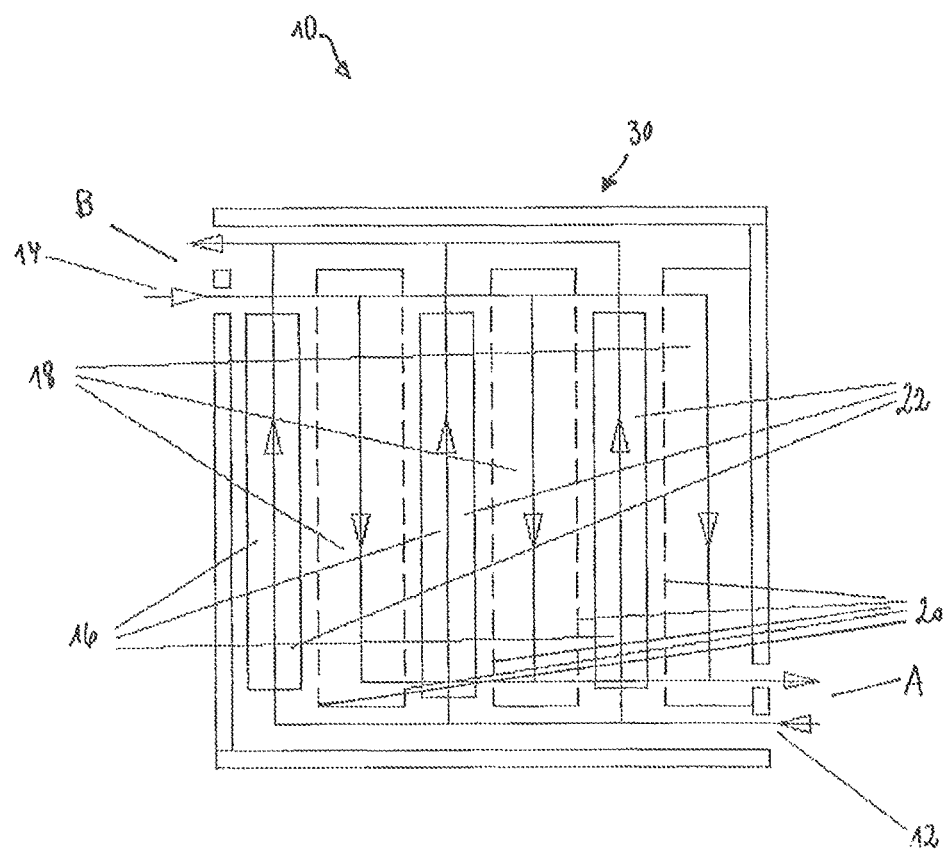
Figure 4:
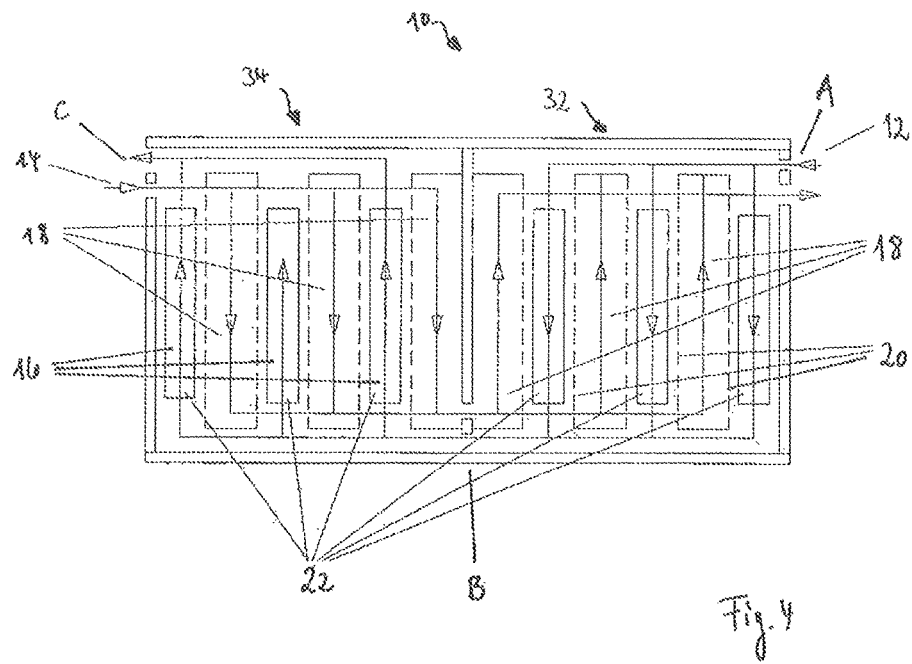
Figure 5:
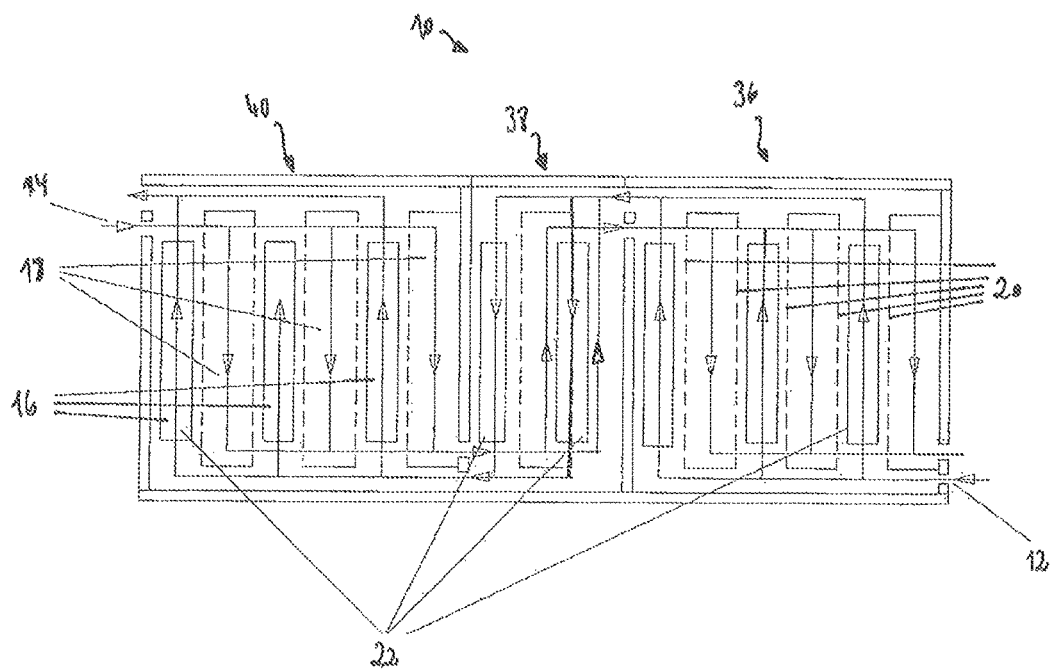
Figure 6:
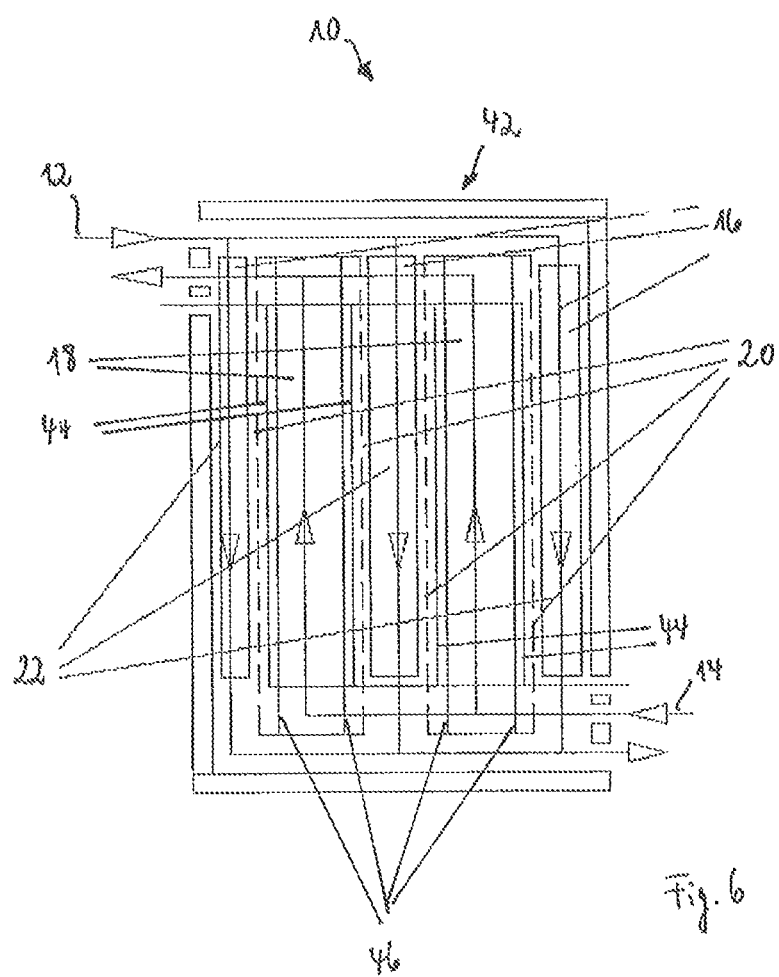
Figure 7:
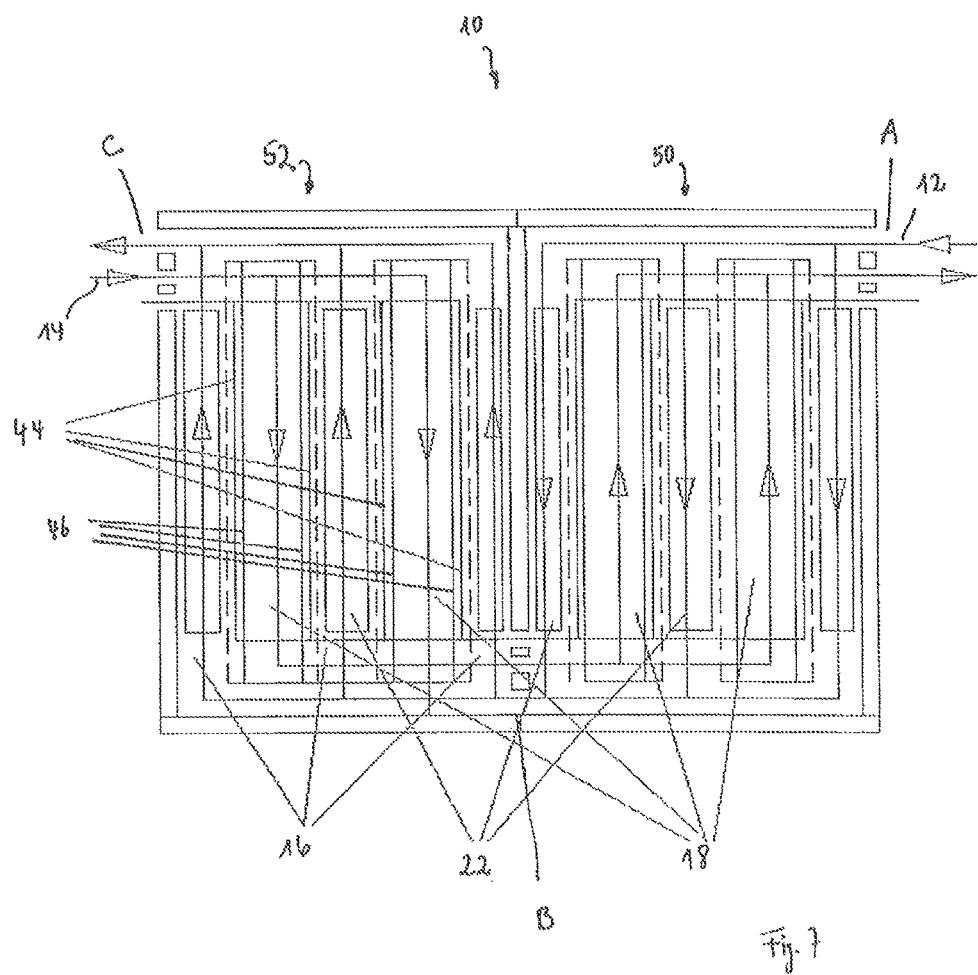
Figure 8:
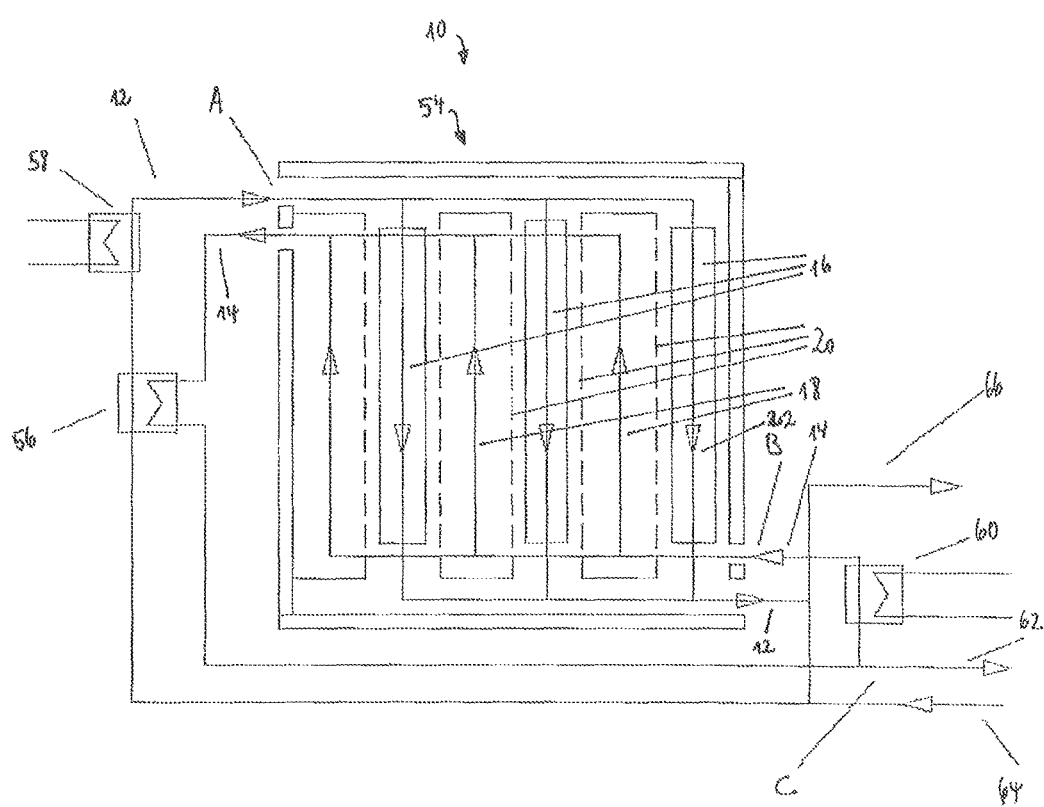
Figure 9:
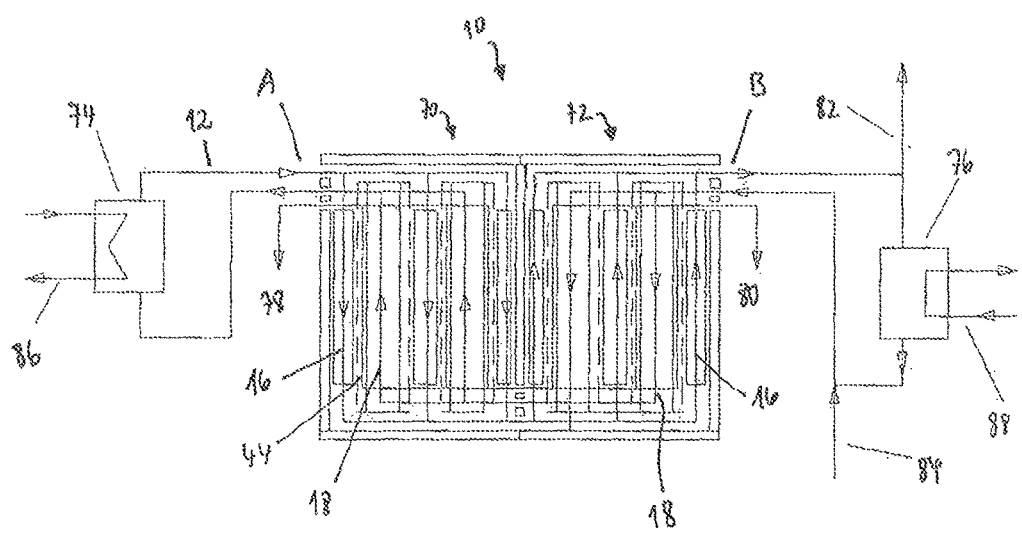
Figure 10:
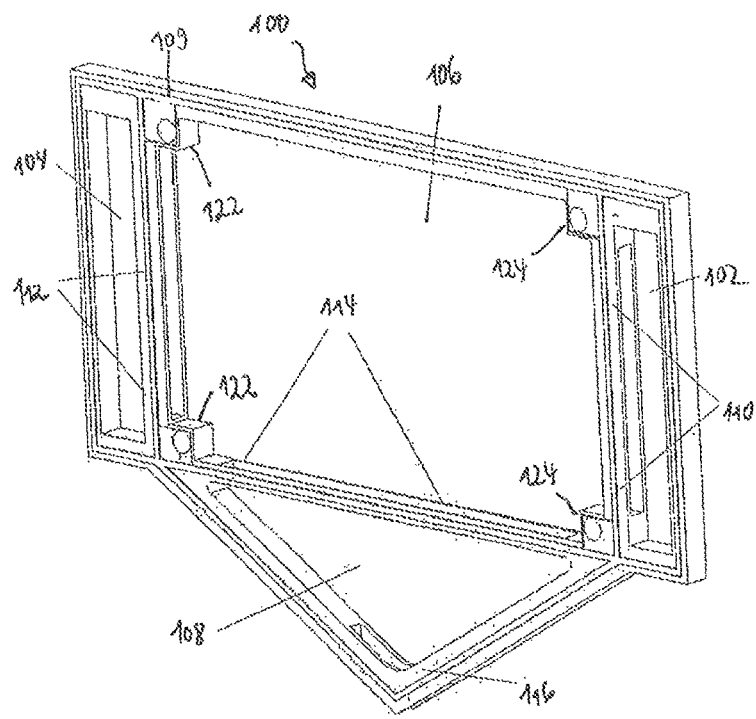
Figure 11:
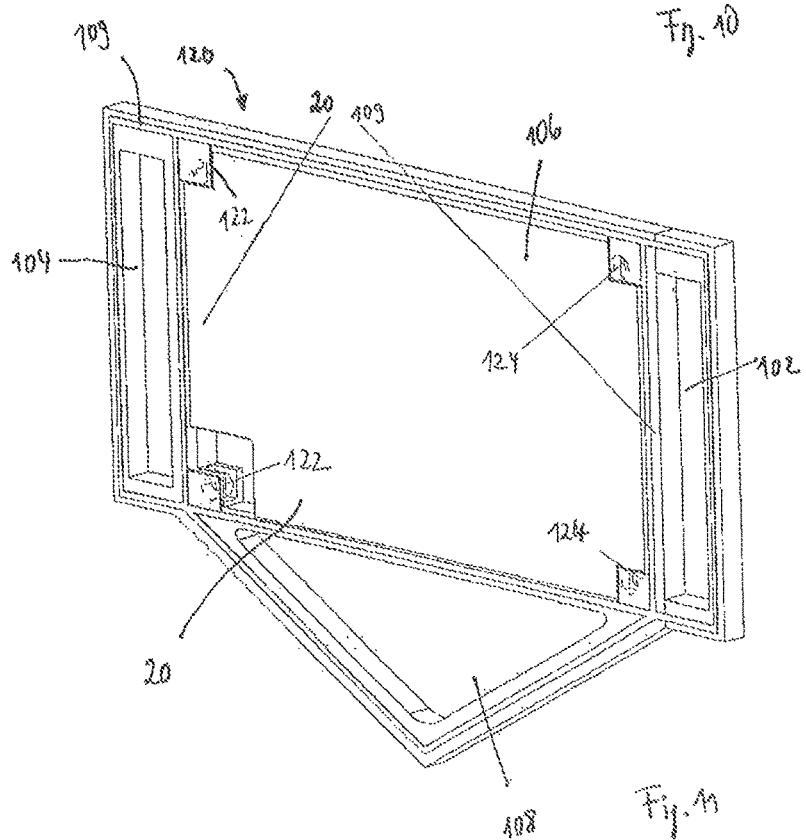
Figure 12:
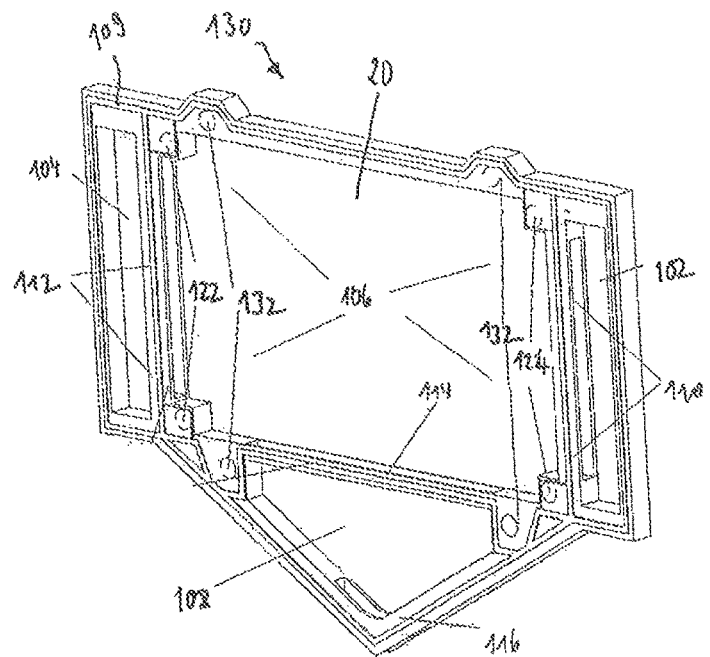
Figure 13:
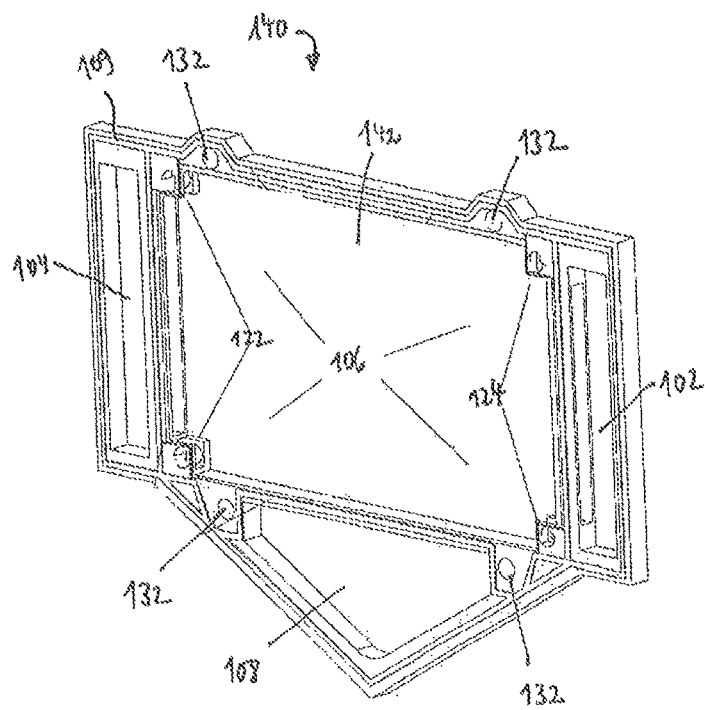

The invention will be described in detail in the following by means of embodiments with reference to the drawings. In these there is shown:

FIG. 1 a schematic illustration of an exemplary embodiment of a system for the crystallization of a material dissolved and to be crystallized in a solvent, having a crystallization apparatus that has a flow passage conducting the solution to be concentrated and has a flow passage conducting the liquid;

FIG. 2 a perspective, schematic illustration of the system of FIG. 1;

FIG. 3 a schematic illustration of an exemplary embodiment of a crystallization system having a plurality of flow passages conducting the solution to be concentrated and switched in parallel with one another and having a plurality of flow passages conducting the liquid and switched in parallel with one another;

FIG. 4 a schematic illustration of an exemplary embodiment of a crystallization system having two stages switched one after the other respectively having a plurality of flow passages conducting the solution to be concentrated and switched in parallel with one another;

FIG. 5 a schematic illustration of an exemplary embodiment of a crystallization system having a plurality of stages switched one after the other that partly have a different number of flow passages conducting the solution to be concentrated and switched in parallel with one another;

FIG. 6 a schematic illustration of an exemplary embodiment of a crystallization system having a flow passage provided for the conducting away of the solvent passed through the membrane wall and arranged between a flow passage conducting the solution to be concentrated and a flow passage conducting the liquid;

FIG. 7 a schematic illustration of an exemplary embodiment of a crystallization system having two stages switched one after the other with respective flow passages provided for the conducting away of the solvent passed through the membrane wall;

FIG. 8 a schematic illustration of an exemplary embodiment of a crystallization system having heat exchangers;

FIG. 9 a schematic illustration of a further exemplary embodiment of a crystallization system having heat exchangers;

FIG. 10 a schematic illustration of an exemplary embodiment of a first type of frame element;

FIG. 11 a schematic illustration of an exemplary embodiment of a second type of frame element:

FIG. 12 a schematic illustration of a further exemplary embodiment of a first type of frame element;

FIG. 13 a schematic illustration of a further exemplary embodiment of a second type of frame element; and FIG. 14 a schematic illustration of an exemplary embodiment of a crystallization system having heat exchangers in the shape of frame elements.

In a schematic illustration FIG. 1 shows an exemplary embodiment of a system for the crystallization of a material dissolved and to be crystallized in a solvent. In this connection the solvent can, for example, be water and the material dissolved therein can, for example, be a salt.

Whereas FIG. 1 shows the system in a top view, the system in FIG. 2 is schematically shown in a perspective illustration.

The system illustrated in FIGS. 1 and 2 has a crystallization apparatus 10 that is flowed through by a solution 12 to be concentrated and by a liquid 14 that has a lower temperature than the solution 12 to be concentrated. The solution 12 to be concentrated includes the solvent with the material dissolved and to be crystallized therein. The crystallization apparatus 10 comprises a flow passage 16 conducting the solution to be concentrated and a flow passage 18 conducting the liquid 14. The internal space of the flow passage 16 conducting the solution 12 to be concentrated is at least partly bound by a membrane wall 20 permeable for the vapor-like solvent but not for the liquid solvent.

The flow passage 18 conducting the liquid 14 is adjacent to the flow passage 16 conducting the solution 12 to be concentrated. In the embodiment shown in the FIGS. 1 and 2, the flow passage 18 conducting the liquid 14 is moreover directly adjacent to the membrane wall 20 of the flow passage 16 conducting the solution 12 to be concentrated. Furthermore, the liquid 14 flows through the crystallization apparatus 10 in counter-flow with respect to the solution 12 to be concentrated.

The liquid 14 has a lower vapor pressure than the solution 12 to be concentrated due to its lower temperature. Consequently, the vapor pressure in the internal space of the flow passage 16 conducting the solution 12 to be concentrated is larger than at the side of the membrane wall 20 adjacent thereto, this means in the internal space of the flow passage 18 conducting the liquid 14. This vapor pressure difference over the membrane wall 20 has the effect that the solvent passes from the solution 12 to be concentrated through the membrane wall 20 in vapor form. For this reason, the solvent is removed from the solution 12 to be concentrated on its path through the flow passage 16, with the solvent being supplied to the liquid 14. Nucleation and crystallization start through the increasing concentration of the material dissolved and to be crystallized in the solution 12 to be concentrated along the flow passage 16.

The flow passage 16 for the solution 12 to be concentrated at least partly has an opening at its lower side at which a sediment collection container 22 adjoins. The crystals arising during the crystallization can sediment into the sediment collection container 22. The flow passage 18 for the liquid 14 generating the potential difference is terminated towards the bottom. The sediment collection container 22 filled with the solution 12 to be concentrated is, however, not flowed through by the solution 12 to be concentrated.

The membrane wall 20 can, for example, be produced from microporous, hydrophobic materials, for example from polytetrafluoroethylene, polypropylene, polyethylene or polyvinylidene fluoride.

The flow of the solution 12 to be concentrated and of the liquid 14 through the respective flow passage 16 or 18 can, for example, be generated by pumps not illustrated in the FIGS. 1 and 2. The respective flow velocity can be set via the pumps.

The solution 12 to be concentrated can have a concentration of the material to be crystallized close to the saturation already on entry into the flow passage 16. Through the reduction of the solvent in the solution 12 to be concentrated the concentration of the material to be crystallized increases along the flow passage 16, whereby finally saturation and oversaturation are achieved and nucleation and crystal growth are brought about. The degree of oversaturation can be set via the flow velocity and the driving inclination caused by the vapor pressure difference over and via the membrane wall 20 and in this way the shape and particle size of the generated crystals can be influenced.

Having regard to thermal methods a small thermal requirement of energy is to be striven for. This is achieved in the crystallization apparatus 10 shown in the FIGS. 1 and 2 in that the solution 12 to be concentrated and the liquid 14 having the lower vapor pressure are guided past the membrane wall 20 in counter-flow. In this respect it is helpful to conduct like heat capacity flows through the flow passages 16 and 18. The thermal amount made available via humidification/evaporation of the solution 12 to be concentrated due to the vapor pressure difference is supplied to the liquid 14 as vapor via the membrane wall 20. This leads to a cooling of the solution 12 to be concentrated and to a heating of the liquid 14 by means of condensation of the solvent vapor passing through the membrane wall 20.

In a schematic representation FIG. 3 shows an exemplary embodiment of a system for the crystallization of a material dissolved and to be crystallized in a solvent, having a crystallization apparatus 10 that is composed of one stage 30. The stage 30 comprises a plurality of flow passages 16 conducting the solution 12 to be concentrated and arranged in parallel with one another and a plurality of flow passages 18 conducting the liquid 14 and arranged in the parallel with one another. In the embodiment in accordance with FIG. 3, the stage 30 comprises three flow passages 16 and three flow passages 18; however, a different number of flow passages 16 and 18 can also be provided.

The flow passages 16 and 18 are alternatingly arranged next to one another in the stage 30. Between adjacent flow passages 16 and 18 a membrane wall 20 is respectively arranged permeable for the vapor-like solvent but not for the liquid solvent. The membrane wall 20 separates the respective flow passages 16 and 18 from one another. The flow passages 16 and 18 respectively separated by a membrane wall 20 are directly adjacent to one another at respective opposite sides of the membrane wall 20. As is shown in FIG. 3, this arrangement in the stage 30 has the effect that two flow passages 18 conducting the liquid 14 are directly adjacent to two flow passages 16 conducting the solution 12 to be concentrated.

The solution 12 to be concentrated is introduced into the stage 30 at the point A; subsequently the solution 12 to be concentrated flows through the three flow passages 16, wherein the solvent passes through the membrane walls 20 into the adjacent flow passages 18 due to the lower vapor pressure of the liquid 14 and condenses there in the liquid 14. The concentration of the material to be crystallized in the solution 12 to be concentrated is thereby increased along the flow passages 16. Moreover, the solution 12 to be concentrated cools during this process. Finally, the solution 12 is conducted away from the stage 30 at the point B.

At the point B the liquid 14 is furthermore supplied to the stage 30 having the lower vapor pressure and is subsequently distributed to the three parallel flow passages 18. During the process taking place in the stage 30 the liquid is heated by means of the condensation of the solvent. The heated liquid 14 exits the stage 30 at the point A. The liquid 14 flows through the stage 30 in counter-flow with respect to the solution 12 to be concentrated.

The flow passages 16 for the solution 12 to be concentrated are respectively at least partly downwardly open into a sediment collection container 22. The crystals arising in the process sediment into the sediment collection spaces 22. The flow passages 18 for the liquid 14 generating the potential difference are thus terminated towards the bottom.

In a schematic illustration FIG. 4 shows an exemplary embodiment of a system for the crystallization of a material dissolved and to be crystallized in a solvent, having a crystallization apparatus 10 that is composed of two stages 32 and 34 switched one after the other. The two stages 32 and 34 are assembled as mirror images.

Furthermore, the two stages 32 and 34 are assembled similar to the stage 30 shown in FIG. 3. Both stages 32 and 34 respectively include a plurality of flow passages 16 conducting the solution 12 to be concentrated and arranged in parallel with one another and a plurality of flow passages 18 conducting the liquid 14 and arranged in parallel with one another. Two respectively directly adjacent flow passages 16 and 18 are separated by a membrane wall 20 that is permeable for the solvent included in the solution 12 to be concentrated in vapor form but not in liquid form.

The solution 12 to be concentrated is introduced into the stage 32 at the point A, transitions into the stage 34 switched thereafter at the point B and exits the stage 34 at the point C. The liquid 14 having the lower vapor pressure is introduced into the stage 34 at the point C, exits into the stage 32 at the point B and leaves the stage 32 at the point A.

Through the switching after one another of the stages 32 and 34 the flow passages 16 add in the length and the flow lengths required for the sedimentation can be achieved in a simple manner.

In a schematic illustration FIG. 5 shows an exemplary embodiment of a system for the crystallization of a material dissolved and to be crystallized in a solvent, having a crystallization apparatus 10 that is composed of three stages 36, 38 and 40 switched one after the other.

The stages 36 and 40 are assembled similar to the stage 34 in accordance with FIG. 4; this means the stages 36 and 40 respectively have three flow passages 16 conducting the solution 12 to be concentrated and arranged in parallel with one another, as well as three flow passages 18 conducting the liquid 14 and arranged in parallel with one another, wherein a respective membrane wall 20 is arranged between two directly adjacent flow passages 16 and 18.

The stage 38 is assembled similar to the stage 32 in accordance with FIG. 4, however, only includes two flow passages 16 conducting the solution 12 to be concentrated in parallel with one another and two flow passages 18 conducting the liquid 14 in parallel with one another with the respective membrane walls 20 arranged therebetween.

As soon as the volume of the solution 12 to be concentrated flowing through the stages 36, 38 and 40 per unit in time is approximately equal for each of the stages 36, 38 and 40, the flow velocity of the solution 12 to be concentrated is increased in the stage 38 having a reduced number of flow passages 16 and the kinetics of the crystallization is influenced.

In a schematic illustration FIG. 6 shows an exemplary embodiment of a system for the crystallization of a material dissolved and to be crystallized in a solvent, having a crystallization apparatus 10. The crystallization apparatus 10 comprises a stage 42 that exemplarily comprises three flow passages 16 conducting the solution 12 to be concentrated and arranged in parallel with one another and two flow passages 18 conducting the liquid 14 and arranged in parallel with one another. The internal space of a respective flow passage 16 conducting the solution 12 to be concentrated is at least partly bound by a membrane wall 20 permeable for the vapor-like solvent but not for the liquid solvent.

In the embodiment in accordance with FIG. 6, a respective flow passage 18 conducting the liquid 14 is not directly adjacent to the membrane wall 20 of the adjacent flow passage 16 conducting the solution 12 to be concentrated, but rather a flow passage 44 provided for the conducting away of the solvent which has passed through the membrane wall 20 is arranged between a respective flow passage 16 conducting the solution 12 to be concentrated and a respective flow passage 18 conducting the liquid 14. Furthermore, the flow passages 18 conducting the liquid 14 are separated from the respective flow passage 44 provided for the conducting away of the solvent passed through the membrane wall 20 by means of a vapor-tight and liquid-tight wall 46.

As the vapor-tight and liquid-tight wall 46 is thermally conductive, the liquid 12 cools the material present in the flow passage 44 via the wall 46 and generates a vapor pressure there that is lower than in the flow passage 16 conducting the solution 12 to be concentrated, from which a vapor pressure difference results via the respective membrane wall 20.

Driven by this vapor pressure difference, the solvent exits as vapor from the solution 12 to be concentrated through the membrane wall 20 and condenses at the wall 46 that is both vapor-tight and liquid-tight for the solvent and that separates the flow passage 44 from the flow passage 18 conducting the liquid 14. The flow passage 44 permits a simple conducting away of the solvent passed through the membrane wall 20 and the condensed solvent.

At the start of the process the flow passage 44 provided for the conducting away of the solvent passed through the membrane wall 20 can be filled with environmental air; after the start of the process it is, however, rapidly filled with the solvent. Through the flow passage 44 arranged between a respective flow passage 16 conducting the solution 12 to be concentrated and a respective flow passage 18 conducting the liquid 14 it is prevented that the solvent passing through the membrane wall 20 dilutes the liquid 14 present in the adjacent flow passage 18.

In the embodiment shown in FIG. 6 a vapor-tight and liquid-tight wall 46 is arranged at both sides of each of the flow passages 18 conducting the liquid 14. A respective flow passage 44 for the conducting away of the solvent directly adjoins at the wall 46. At its oppositely disposed side each of the flow passages 44 directly adjoins at a membrane wall 20 that separates the respective flow passage 44 from the adjacent flow passage 16 for the solution 12 to be concentrated disposed at the other side of the membrane wall 20.

The liquid 14 flows through the crystallization apparatus 10 in counter-flow with respect to the solution 12 to be concentrated. Furthermore, the flow passages 16 for the solution 12 to be concentrated are respectively at least partly downwardly open into a sediment collection space 22. The crystals arising in the process sediment into the sediment collection spaces 22. The flow passages 18 for the liquid 14 generating the potential difference are thus terminated towards the bottom.

If the membrane wall 20 is microporous and a crystallization is brought about in the membrane wall 20, then this can lead to a growth of the crystals through the membrane wall 20. As a consequence, the solution 12 to be concentrated can arise through a membrane wall 20 via the crystals grown through from the flow passage 16 into the flow passage 18. In this case the relative pressure between the flow passages 16 and 18 can be set in such a way that the pressures in the flow passages 16 and 18 are equal or the pressure in the flow passage 18 is higher than in the flow passage 16. For example, a back-flushing of the pores can be brought about through which the crystal growth has taken place. The pressure difference between the flow passages 16 and 18 can also be periodically built up.

In a schematic illustration FIG. 7 shows an exemplary embodiment of a system for the crystallization of a material dissolved and to be crystallized in a solvent, having a crystallization apparatus 10 composed of two stages 50 and 52 switched one after the other. The stages 50 and 52 correspond in their assembly to the stage 42 shown in FIG. 6. In particular the two stages 50 and 52 have flow passages 44 that are arranged between a respective flow passage 16 conducting the solution 12 to be concentrated and a respective flow passage 18 conducting the liquid 14 and are provided for the conducting away of the solvent passed through the membrane wall 20. Furthermore, the stages 50 and 52 are assembled as mirror images with respect to one another.

The solution 12 to be concentrated is introduced into the stage 50 at the point A, transitions into the stage 52 switched thereafter at the point B and exits the stage 52 at the point C. The cold liquid 14 is introduced into the stage 52 at the point C, goes over into the stage 50 at the point B and exits the stage 50 at the point A. Furthermore, outlets for the solvent conducted away by the flow passages 44 are provided at the points A and C.

In a schematic illustration FIG. 8 shows an exemplary embodiment of a system for the crystallization of a material dissolved and to be crystallized in a solvent, having a crystallization apparatus 10. The crystallization apparatus 10 comprises a stage 54 that has the same assembly like the stage 30 shown in FIG. 3, wherein the stage 54 is, however, flowed through in a reverse direction like the stage 30. Moreover, the system illustrated in FIG. 8 comprises heat exchangers 56, 58 and 60 for energy recovery.

In FIG. 8 the solution 12 to be concentrated enters at the point A as heated into the crystallization apparatus 10 and flows through the crystallization apparatus 10 in counterflow with respect to the colder liquid 14. The cooled liquid 14 enters into the crystallization apparatus 10 at the point B. The solution 12 to be concentrated cools through thermal conductance via the membrane wall 20 and the evaporation of the solvent. In the same ratio the liquid 14 is heated via thermal conductance and condensation of the solvent. The cooled solution 12 to be concentrated exits the crystallization apparatus 10 at the point B. The heated liquid 14 exits the crystallization apparatus 10 at the point A.

The heated liquid 14 exiting from the crystallization apparatus 10 is cooled in the heat exchanger 56 and the solution 12 to be concentrated exiting from the crystallization apparatus 10 is heated. In the heat exchanger 58 the solution 12 to be concentrated coming from the heat exchanger 56 is further heated until it is warmer than the liquid 14 exiting the crystallization apparatus 10 at the point A. In the heat exchanger 60 the liquid 14 coming from the heat exchanger 56 is cooled so far until it is colder than the solution 12 to be concentrated is at the point B, this means until a sufficient potential difference for the material transfer from the solution 12 to be concentrated into the liquid 14 is achieved. The heat exchangers 58 and 60 can generally be configured as heating and/or cooling elements.

The volume flow of the liquid 14 is increased by means of material transfer from the solution 12 to be concentrated. This additional volume flow 62 of the liquid 14 can be removed from the liquid 14 at the point C. Likewise the volume flow reduced by means of material transfer of the solution 12 to be concentrated can be filled up by a volume flow 64 at the point C. Moreover, it is possible to exclude a part 66 of the solution 12 to be concentrated from the system at the point C.

In a schematic illustration FIG. 9 shows an exemplary embodiment of a system for the crystallization of a material dissolved and to be crystallized in a solvent, having a crystallization apparatus 10. The crystallization apparatus 10 comprises two stages 70 and 72 switched one after the other that have the same assembly like the stages 50 and 52 shown in FIG. 7, wherein the stages 70 and 72 are, however, flowed through in the reverse direction as the stages 50 and 52.

In the embodiment illustrated in FIG. 9 both the flow passages 16 and the flow passages 18 are flowed through by the solution 12 to be concentrated. During the flowing through of the flow passages 18 the solution 12 to be concentrated thus serves as a coolant for the generation of the vapor pressure difference via the membrane walls 20.

Besides the crystallization apparatus 10, the system illustrated in FIG. 9 comprises heat exchangers 74 and 76. The heat exchanger 74 further heats the solution 12 to be concentrated that exits the crystallization apparatus 10 from the flow passages 18 at the point A and that was preheated during the flowing through the flow passages 18. The solution 12 to be concentrated is heated so far that it always has a driving potential on a flow through the crystallization apparatus 10 from the heated solution 12 to be concentrated via the flow passage 44 conducting away the solvent into the flow passage 18. The solution 12 to be concentrated heated by the heat exchanger 74 is supplied to the flow passages 16 of the stage 70. The solvent accruing in the flow passages 44 can be conducted away from the crystallization apparatus 10 at the position 78 or 80.

The depleted solution 12 to be concentrated exits from the flow passages 16 of the crystallization apparatus 10 at the point B. The solution 12 to be concentrated can then be completely or partly conducted away from the system with a flow 82. If the solution 12 to be concentrated exiting from the crystallization apparatus 10 at the point B is again supplied completely or partly to the crystallization apparatus 10, then the solution 12 to be concentrated is cooled so far with the heat exchanger 76 that it has such a temperature on entrance into the flow passages 18 at the point B that a driving potential is always present via the flow passages 44 in the flow passages 16 for the solution 12 to be concentrated. The solution 12 to be concentrated can be resupplied via a flow 84. The solution 12 to be concentrated that is cooled by means of the heat exchanger 76 is then supplied to the flow passages 18 of the stage 72.

The heat exchanger 74 is heated via a heating flow 86 and the heat exchanger 76 is cooled by a cooling flow 88. Alternatively, heating elements or cooling elements of different design can be used.

The system described herein for the crystallization of a material dissolved and to be crystallized in a solvent and in particular the crystallization apparatus can be assembled from a plurality of frame elements that can be combined for the formation of different functional units. In this connection the crystallization apparatus 10 can, for example, be assembled from two different types of frame element that are alternatingly combined to form a stack. In the FIGS. 10 and 11 respectively 12 and 13 such pairs of frame elements are shown that will be described in the following.

FIG. 10 shows a frame element 100 of a first type of frame element for the crystallization apparatus 10. The frame element 100 has an outer frame provided with a distribution passage 102 and a collection passage 104, a central internal region 106 bound by the outer frame as well as a sediment collection region 108 arranged beneath the central internal region 106. Moreover, the frame element 100 is respectively provided with a welded web structure 109 at both sides that bounds the passages 102 and 104, the central internal region 106 and the sediment collection region 108.

The distribution and collection passages 102 and 104 are respectively connected to the central internal region 106 via an opening 110 or 112 in the frame element 100. Furthermore, the central internal region 106 is connected to the sediment collection region 108 via an opening 114 in the frame element 100.

The distribution passage 102 leads the solution 12 to be concentrated into the central internal region 106 via the opening 110. From there the solution 12 to be concentrated arrives in the collection passage 104 via the opening 112. Via the opening 114 the crystals can sediment into the sediment collection region 108. Beneath the sediment collection region 108 an opening 116 can be provided in the frame element 100 via which the crystal sediment into the sediment collection region 108 can be removed. The central internal region 106 of the frame element 100 can have a grid structure for mixing the solution 12 to be concentrated.

FIG. 11 shows a frame element 120 of a second type of frame element for the crystallization apparatus 10. Just like the frame element 100 illustrated in FIG. 10 the frame element 120 has an outer frame provided with a distribution passage 102 and a collection passage 104, a central internal region 106 bound by the outer frame and a sediment collection region 108 arranged beneath the central internal region 106. In contrast to the frame element 100, the distribution passage 102, the collection passage 104 and the sediment collection region 108 are not connected to the central internal region 106 via openings in the frame element 120. Furthermore, the frame element 120 is provided at both sides with a respective welded web structure 109.

The potential difference for the concentration and crystallization is generated in the frame element 120. The frame element 120 is provided at both sides with a membrane wall 20 permeable for the vapor-like solvent but not for the liquid solvent. The membrane wall 20 covers the complete central internal region 106, wherein the distribution passage 102, the collection passage 104 and the sediment collection region 108 are not covered by the membrane wall 20. Preferably, the membrane wall 20 is welded to the frame element 120.

The liquid 14 having a lower vapor pressure in comparison to the solution 12 to be concentrated is conducted into the central internal region 106 and/or conducted away from there via inlets 122 and outlets 124 arranged at the edges of the central internal region 106. The central internal region 106 of the frame element 120 can have a grid structure for mixing the liquid 14 and for supporting the membrane wall 20. The inlets and outlets 122 and 124 are not directly covered by the membrane wall 20.

The passages of the inlets 122 and 124 furthermore pass through the frame element 100 shown in FIG. 10; however, in contrast to the frame element 120, the inlets 122 and 124 in the frame element 100 are not connected to the central internal region 106 by means of openings.

The types of frame element 100 and 120 shown in the FIGS. 10 and 11 can be welded to one another to form stacks via the welded web structures 109, wherein the frame elements 100 and 120 can be connected to a series. Other connection possibilities, such as for example adhesive bonding are likewise plausible. In this connection the frame elements 100 and 120 are expediently configured in such a way that the distribution passages 102, the collection passages 104, the sediment collection regions 108, and the inlets 122 and the outlets 124 of the frame elements 100 and 120 arranged next to one another respectively align with one another.

Crystallization apparatuses 10 can be created by means of the frame elements 100 and 120 in which a respective flow passage 18 conducting the liquid 14 is directly adjacent to the membrane wall 20 of a respective flow passage 16 conducting the solution 12 to be concentrated. Examples of such crystallization apparatuses 10 are shown in the FIGS. 1 to 5 and 8.

Crystallization apparatuses 10 such as are shown, for example, in the FIGS. 6, 7 and 9 and in which a flow passage 44 provided for the conducting away of the solvent passed through the membrane wall 20 is arranged between a respective flow passage 16 conducting the solution 12 to be concentrated and a respective flow passage 18 conducting the liquid 14, can be produced by means of the frame elements shown in the FIGS. 12 and 13.

FIG. 12 shows a frame element 130 of a first type of frame element that is generally in conformity with the frame element 100 shown in FIG. 10. Just like the frame element 100 illustrated in FIG. 10 the frame element 130 has an outer frame provided with a distribution passage 102 and a collection passage 104, a central internal region 106 bound by the outer frame and a sediment collection region 108 arranged beneath the central internal region 106. Furthermore, the distribution and collection passages 102 and 104 are respectively connected to the central internal region 106 via an opening 110 and 112 respectively in the frame element 130. The central internal region 106 is connected to the sediment collection region 108 via an opening 114 in the frame element 130. Beneath the sediment collection region 108 an opening 116 for removing the crystal sediment in the sediment collection region 108 is provided. Furthermore, the passages of the inlets 122 and outlets 124 pass through the frame element 130, however, are not open into the central internal region 106.

Furthermore, the frame element 130 is provided at both sides with a membrane wall 20 permeable for the vapor-like solvent but not for the liquid solvent. The membrane wall 20 covers the complete central internal region 106, wherein the distribution passage 102, the collection passage 104, the sediment collection region 108, the inlets 122 and the outlets 124 are not covered by the membrane wall 20. Preferably, the membrane wall 20 is welded to the frame element 130.

Furthermore, the frame element 130 has openings 132 through which the solvent passed through the membrane wall 20 can be conducted away. The openings 132 are not covered by the membrane wall 20.

During the crystallization process the solution 12 to be concentrated is guided into the central internal region 106 of the frame element 130 via the distribution passage 102 and the opening 110. From there the solution 12 to be concentrated passes into the collection passage 104 via the opening 112. Via the opening 114 the generated crystals can sediment into the sediment collection region 108. The central internal region 106 of the frame element 130 can have a grid structure for mixing the solution 12 to be concentrated and for supporting the membrane wall 20.

FIG. 13 shows a frame element 140 of a second type of frame element that is generally in conformity with the frame element 120 illustrated in FIG. 11. Just like the frame element 120 illustrated in FIG. 11 the frame element 140 has an outer frame provided with a distribution passage 102 and a collection passage 104, a central internal region 106 bound by the outer frame and a sediment collection region 108 arranged beneath the central internal region 106. The distribution passage 102, the collection passage 104 and the sediment collection region 108 are not connected to the central internal region 106 through openings in the frame element 140. Moreover, inlets 122 and outlets 124 are arranged at the edges of the central internal region 106. Furthermore, openings 132 are introduced into the frame element 140.

The frame element 140 is provided at both sides with a vapor-tight and liquid-tight film 142. The film 142 covers the complete central internal region 106, wherein the distribution passage 102, the collection passage 104, the sediment collection region 108, the inlets 122, the outlets 124 and the openings 132 are not covered by the film 142. Preferably, the film 142 is welded to the frame element 140.

The liquid 14 having a lower vapor pressure in comparison to the solution 12 to be concentrated is conducted into the central internal region 106 of the frame element 140 and/or conducted away from there via the inlets 122 and the outlets 124. The central internal region 106 of the frame element 140 can have a grid structure for mixing the liquid 14 and for supporting the film 142.

The frame elements 130 and 140 are alternatingly arranged next to one another for the assembly of a crystallization apparatus 10 and are preferably welded to one another. In this connection the frame elements 130 and 140 are expediently configured in such a way that the distribution passages 102, the collection passages 104, the sediment collection regions 108, the inlets 122, the outlets 124 and the openings 132 of the frame elements 130 and 140 arranged next to one another respectively align with one another.

During the operation of the crystallization apparatus 10 the solvent passed through the membrane wall 20 collects in the intermediate space that is formed by the alternating arrangement of the frame elements 130 and 140 next to one another between a respective membrane wall 20 and the adjacent film 142. The solvent collected there can be conducted away by the openings 132.

Suitable materials for the previously described frame elements 100, 120, 130 and 140 are, for example, polypropylene, polyethylene, polyamide and polyvinylidene fluoride.

In a schematic illustration FIG. 14 shows an exemplary embodiment of a system for the crystallization of a material dissolved and to be crystallized in a solvent, having a crystallization apparatus 10. The crystallization apparatus 10 comprises two stages 150 and 152 switched one after the other that are identical to the stages 70 and 72 shown in FIG. 9. The heat exchangers 74 and 76 illustrated in FIG. 9 have been replaced by heat exchangers 154 and 158 assembled from frame elements 130 and 140 in FIG. 14.

The heat exchanger 154 is assembled from frame elements 130 and 140, wherein the frame elements 130 and 140 are alternatingly assembled to form stacks and the membrane wall 20 has been omitted in the frame element 130. The solution 12 to be concentrated flows through the central internal regions 106 of the frame elements 130, whereas the central internal regions 106 of the frame elements 140 are flowed through by a heating flow 160 supplied from the outside to the heat exchanger 154. Alternatively, it could also be plausible to let the solution 12 to be concentrated flow through the central internal regions 106 of the frame elements 140 and the heating flow 160 flow through the central internal regions 106 of the frame elements 130.

The solution 12 to be concentrated enters at the flow passages 18 of the crystallization apparatus 10 into the heat exchanger 154 at the point A. Through the heat transfer from the heating flow 160 through the films 142 of the frame elements 140 the solution to be concentrated is heated on passing through the heat exchanger 154. The thereby heated solution 12 to be concentrated is supplied to the flow passages 16 of the crystallization apparatus 10 at the point A.

In a corresponding manner the heat exchanger 158 is assembled from frame elements 130 and 140, wherein the frame elements 130 and 140 are alternatingly assembled to form stacks and the membrane wall 20 has been omitted in the frame element 130. The solution 12 to be concentrated flows through the central internal regions 106 of the frame elements 130, whereas the central internal regions 106 of the frame elements 140 are flowed through by a coolant flow 162 supplied from the outside to the heat exchanger 158.

The solution 12 to be concentrated enters at the flow passages 16 of the crystallization apparatus 10 into the heat exchanger 158 at the point B. With the aid of the cooling flow 162 the solution 12 to be concentrated is cooled on the passage through the heat exchanger 158. Subsequently, the cooled solution 12 to be concentrated is supplied to the flow passages 18 of the crystallization apparatus 10 at the point B.

The continuous cooling of the solution 12 to be concentrated taking place in the heat exchanger 158 reduces the solubility of most of the dissolved materials and a further crystallization takes place. The thus generated crystals sediment into the sediment collection containers 22 formed from the sediment collection regions 108 of the frame elements 130 and 140.

The solvent collected in the flow passages 44 of the crystallization apparatus 10 can be conducted away via the openings 132 in the frame elements 130 and 140 and exits the system at the points 164 and 166.

As an alternative to the vapor-permeable but liquid-tight membrane wall 20, an ion-selective membrane wall can be used in the above-described crystallization apparatuses 10 at whose one side a draw solution having a high concentration and in this way a high osmotic pressure is present instead of the liquid 14 and at whose other side the solution 12 to be concentrated is present having a reduced concentration and a reduced osmotic pressure. Due to the concentration differences and the in this way associated osmotic pressure difference the solvent passes through the ion-selective membrane wall into the draw solution. The ions of the material to be crystallized are retained by the membrane wall and the desired concentration of the solution arises.

It should be noted that, during the forwards osmosis, the flow passage 18 conducting the draw solution is always directly adjacent to the ion-selective membrane wall of the flow passage 16 conducting the solution 12 to be concentrated. Consequently, the forwards osmosis can only be realized using the crystallization apparatuses 10 shown in the FIGS. 1 to 5 and 8 and using the frame elements 100 and 120 shown in the FIGS. 10 and 11. All designs described in connection with these Figures can be used for the forwards osmosis.

LIST OF REFERENCE NUMERALS 10 crystallization apparatus
12 solution to be concentrated
14 liquid
16 flow passage
18 flow passage
20 membrane wall
22 sediment collection container
30 stage
32 stage
34 stage 36 stage
38 stage
40 stage
42 stage
44 flow passage
46 wall
50 stage
52 stage
54 stage
56 heat exchanger
58 heat exchanger
60 heat exchanger
62 flow
64 flow
66 flow
70 stage
72 stage
74 heat exchanger
76 heat exchanger
78 position
80 position
82 flow
84 flow
86 heating flow
88 cooling flow
100 frame element
102 distribution passage
104 collection passage
106 central internal region
108 sediment collection region
109 welded web structure
110 opening
112 opening
114 opening
116 opening
120 frame element
122 inlet
124 outlet
130 frame element
132 opening
140 frame element
142 film
150 stage
152 stage
154 heat exchanger
158 heat exchanger
160 heating flow
162 cooling flow
164 point
166 point

The invention claimed is:

1. A system for the crystallization of a material dissolved and to be crystallized in a solvent, having a crystallization apparatus flowed through by a solution to be concentrated, the solution having the solvent with the material dissolved and to be crystallized therein, and by a liquid that has a lower temperature than the solution to be concentrated, wherein the crystallization apparatus has at least one flow passage conducting the solution to be concentrated and has at least one flow passage conducting the liquid, wherein the internal space of the at least one flow passage conducting the solution to be concentrated is bound at least partly by a membrane wall permeable for a vapor-like solvent but not for the liquid solvent, and the at least one flow passage conducting the liquid is adjacent to the at least one flow passage conducting the solution to be concentrated, whereby a vapor pressure difference is set via the membrane wall in such a way that the vapor-like solvent passes from the solution to be concentrated through the membrane wall, wherein:

the crystallization apparatus has a plurality of frame elements that can be combined with one another for the formation of different functional units, to form stacks comprising at least two frame elements, wherein each of the plurality of frame elements has an outer frame, a central internal region bound by the outer frame and a sediment collection region arranged beneath the central internal region, the crystallization apparatus has at least two different types of frame elements that are alternatingly combined to form a stack, wherein the central internal region of the one type of frame element forms a part of the at least one flow passage conducting the solution to be concentrated and the central internal region of the other type of frame element forms a part of the at least one flow passage conducting the liquid, the membrane wall is arranged on each side of the central internal region of the one type of frame element, the membrane wall being permeable for the vapor-like solvent but not for the liquid solvent, a vapor-tight and liquid-tight film arranged on each side of the central internal region of the other type of frame element, and an intermediate space between the membrane wall and the film forms a part of the at least one flow passage provided for the conducting away of the solvent which has passed through the membrane wall, wherein the at least one flow passage conducting the solution to be concentrated and the at least one flow passage conducting the liquid are arranged in alternating directions so as direct the solution and the liquid in a cross-flow pattern.

2. The system in accordance with claim 1, wherein the stacks comprise at least ten frame elements.

3. The system in accordance with claim 1, wherein the membrane wall is welded to each side of the central internal region of the one type of frame element.

4. The system in accordance with claim 1, wherein the vapor-tight and liquid-tight film is respectively welded to each side of the central internal region of the other type of frame element.

5. The system in accordance with claim 1 wherein the liquid flows through the crystallization apparatus in counter-flow with respect to the solution to be concentrated.

6. The system in accordance with claim 1 wherein the crystallization apparatus has a plurality of stages connected in series, wherein each stage comprises a plurality of flow passages conducting the solution to be concentrated and arranged in parallel with one another and wherein at least two of the stages have a different number of flow passages conducting the solution to be concentrated.

7. The system in accordance with claim 1, wherein the system has a heat exchanger that cools a liquid flowing out of the crystallization apparatus.

8. The system in accordance with claim 1 wherein the system has a cooling element and has a heating element and both the at least one flow passage conducting the solution to be concentrated and the at least one flow passage conducting the liquid are flowed through by the solution to be concentrated, wherein the cooling element and an input of the at least one flow passage conducting the liquid are connected downstream of an output of the at least one flow passage conducting the solution to be concentrated and wherein the heating element and an input of the at least one flow passage conducting the solution to be concentrated are connected downstream of an output of the at least one flow passage conducting the liquid.

\* \* \* \* \*